(12) United States Patent
Kim et al.

(10) Patent No.: US 9,552,095 B2
(45) Date of Patent: Jan. 24, 2017

(54) TOUCH SCREEN CONTROLLER AND METHOD FOR CONTROLLING THEREOF

(71) Applicant: HiDeep Inc., Gyeonggi-do (KR)

(72) Inventors: Bonkee Kim, Gyeonggi-do (KR); Seyeob Kim, Gyeonggi-do (KR)

(73) Assignee: HIDEEP INC. (KR)

( * ) Notice: Subject to any disclaimer, the term of this patent is extended or adjusted under 35 U.S.C. 154(b) by 111 days.

(21) Appl. No.: 14/565,746

(22) Filed: Dec. 10, 2014

(65) Prior Publication Data
US 2015/0160778 A1 Jun. 11, 2015

(30) Foreign Application Priority Data

Dec. 10, 2013 (KR) ........................ 10-2013-0153168

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0414* (2013.01); *G06F 2203/04104* (2013.01); *G06F 2203/04105* (2013.01)

(58) Field of Classification Search
CPC ............ G06F 3/033; G06F 3/02; G06F 3/041; G06F 3/045; G06F 3/042; G09G 5/08; G09G 5/00; G06K 11/06; G08C 21/00
See application file for complete search history.

(56) References Cited

U.S. PATENT DOCUMENTS

| | | | | |
|---|---|---|---|---|
| 6,611,258 B1 * | 8/2003 | Tanaka | ................ | G06F 3/0433 345/173 |
| 9,213,424 B1 * | 12/2015 | Dunn | ................ | G06F 3/03545 |
| 2008/0284753 A1 * | 11/2008 | Hsu | ................ | G06F 3/0416 345/174 |
| 2013/0050111 A1 * | 2/2013 | Shibata | ................ | G06T 11/203 345/173 |
| 2013/0093692 A1 * | 4/2013 | Wang | ................ | G06F 3/0416 345/173 |
| 2013/0176247 A1 * | 7/2013 | Jogo | ................ | G06F 3/041 345/173 |
| 2014/0267078 A1 * | 9/2014 | Kukulski | ................ | G06F 3/0416 345/173 |

(Continued)

FOREIGN PATENT DOCUMENTS

KR 1020100020389 2/2010

OTHER PUBLICATIONS

Corresponding Office Action issued by the KIPO on Dec. 31, 2014.

*Primary Examiner* — Pegeman Karimi
(74) *Attorney, Agent, or Firm* — The Belles Group, P.C.

(57) ABSTRACT

A touch panel control device may be provided that includes: a touch panel which generates at least one touch signal in response to a touch of an object; a displayer; and a controller which performs a first touch action mode in which the change of the touch position of the object is displayed on the displayer by a line in response to the object which has touched the touch panel, and performs a second touch action mode in which, in response to the position change of the object which corresponds to the position of the line displayed on the displayer, it is to carry out at least one of the removal of at least a portion of the line displayed on the displayer and the change of the color coordinate of the line. Also, a method for controlling the touch panel may be also provided.

23 Claims, 13 Drawing Sheets

(56) References Cited

U.S. PATENT DOCUMENTS

2014/0354583 A1* 12/2014 Tokutake .............. G06F 3/0416
345/174
2015/0160729 A1* 6/2015 Nakagawa .............. G06F 3/016
345/173

* cited by examiner

Fig. 4a

|    | Y1 | Y2  | Y3 |    |
|----|----|-----|----|----|
|    | 3  | 10  | 3  | X1 |
|    | 10 | 100 | 10 | X2 |
|    | 3  | 10  | 3  | X3 |

Fig. 4b

|    | Y1 | Y2 | Y3 |    |
|----|----|----|----|----|
|    | 8  | 8  | 2  | X1 |
|    | 50 | 50 | 5  | X2 |
|    | 8  | 8  | 2  | X3 |

Fig. 5a

|    | Y1 | Y2  | Y3 |     |
|----|----|-----|----|-----|
|    | 10 | 30  | 10 | X21 |
|    | 30 | 100 | 30 | X22 |
|    | 10 | 30  | 10 | X23 |

Fig. 5b

|    | Y1 | Y2 | Y3 |     |
|----|----|----|----|-----|
|    | 25 | 25 | 8  | X21 |
|    | 50 | 50 | 10 | X22 |
|    | 25 | 25 | 8  | X23 |

TOUCH SCREEN CONTROLLER AND METHOD FOR CONTROLLING THEREOF

CROSS REFERENCE TO RELATED APPLICATIONS

Priority is claimed under 35 U.S.C. §119 to Korean Patent Application No.: 10-2013-0153168, filed Dec. 10, 2013, the disclosure of which is incorporated herein by reference in its entirety.

FIELD OF THE INVENTION

The present invention relates to a touch panel control device and a method for controlling the same.

BACKGROUND OF THE INVENTION

A touch panel is a device for inputting information by performing a touch operation (hereafter, referred to as touch) on the characters or a particular location on the display screen through use of a user's finger, a stylus pen and the like without using an input device like a keyboard or a mouse. The touch panel is used in mobile electronic equipments like PDA, a mobile terminal, a variety of electric home appliances, an automatic teller machine, etc.

When multiple objects approach or touch the touch panel by means of the finger and stylus pen, the touch panel is able to simultaneously detect the multiple objects and to detect the shapes of the objects in more detail. To use this ability, it is necessary to measure, identify and distinguish between many kinds of the objects capable of approaching or touching the touch panel at the same time. However, devices equipped with a conventional touch panel (including their support software and/or circuits) cannot stably measure, identify, and distinguish between the objects. For example, in a case where two touch panels are provided, this has a significantly reduced space-efficiency. Besides, in a device equipped with a single touch panel, the user may be enabled to switch a finger mode or a stylus mode by adding a separate input-mode conversion button or conversion menu. However, the separate input-mode conversion button requires a high cost and the device becomes more complicated and has a larger volume. Also, regarding the conversion menu, it is very troublesome to enter a desired menu and to change the input mode.

SUMMARY OF THE INVENTION

One embodiment is a touch panel control device including: a touch panel which generates at least one touch signal in response to a touch of an object; a displayer; and a controller which performs a first touch action mode in which the change of the touch position of the object is displayed on the displayer by a line in response to the object which has touched the touch panel, and performs a second touch action mode in which, in response to the position change of the object which corresponds to the position of the line displayed on the displayer, it is to carry out at least one of the removal of at least a portion of the line displayed on the displayer and the change of the color coordinate of the line.

The controller independently sets the first touch action mode or the second touch action mode to the touch signal in response to a capacitance change amount of a valid touch region corresponding to a touch area of the object which touches the touch panel in response to the touch signal The controller performs the first touch action mode by the touch signal to which the first touch action mode has been set and performs the second touch action mode by the touch signal to which the second touch action mode has been set.

The controller includes a touch processor and an application processor. The touch processor independently sets the first touch action mode or the second touch action mode in response to a capacitance change amount of a valid touch region corresponding to the touch area of the object which touches the touch panel in response to the touch signal. The application processor performs the first touch action mode by the touch signal to which the first touch action mode has been set and performs the second touch action mode by the touch signal to which the second touch action mode has been set.

The controller includes a touch processor and an application processor. The touch processor independently sets the first touch action mode or the second touch action mode in response to a capacitance change amount of a valid touch region corresponding to a distribution of a pressure which the object applies to touch panel in response to the touch signal. The application processor performs the first touch action mode by the touch signal to which the first touch action mode has been set and performs the second touch action mode by the touch signal to which the second touch action mode has been set.

The controller further includes a memory. The memory stores area information on a valid touch region of the object so as to at least distinguish the first touch action mode and the second touch action mode.

The memory stores information on a shape of a plurality of the valid touch regions. The controller determines whether the valid touch occurs or not by using the shape information.

When at least a portion of the line is removed, the width of the line which is displayed on the displayer becomes smaller or the length of the line becomes shorter.

The controller determines a thickness of the line to be displayed on the displayer in accordance with the first touch action mode, in response to a touch area between the object and the touch panel.

The controller determines a ratio of removing a width of the line displayed on the displayer in accordance with the second touch action mode or a ratio of differently setting a color coordinate of the line, in response to a touch area between the object and the touch panel.

The touch panel control device further includes a pressure sensor which recognizes a pressure applied to the touch panel by the object and outputs a pressure signal. In response to the pressure signal, the controller determines a thickness or color coordinate of the line which is displayed in the first touch action mode, and determines a thickness or color coordinate of the line which is erased in the second touch action mode.

The controller further includes a pressure signal sensor which processes the pressure signal.

The controller further displays pressure information corresponding to the pressure signal on the displayer.

The memory stores information on a coordinate value of the line which is displayed on the displayer by the controller and information on the coordinate value of the line of which at least a portion is removed or of which the color coordinate is changed.

The controller compares a predetermined threshold value with at least one of a sum of a capacitance change amount of each of sensing cells within the valid touch region, the number of the sensing cells with the capacitance change amount greater than a predetermined capacitance change amount within the touch region, and the number of the sensing cells of which the capacitance change amount is greater than a predetermined rate of the maximum capacitance change amount or minimum capacitance change amount within the touch region, a ratio of a sum of a predetermined number of the upper capacitance change amounts to a sum of the predetermined number of the lower capacitance change amounts within the touch region, and then determines which one of the first and the second touch operation modes a touch operation mode of the object corresponds to.

Another embodiment is method for controlling a touch panel which displays a plurality of touch signals generated by touching the touch panel. The method includes: displaying at least one line by using the touch signals to which a first touch action mode has been set among the plurality of touch signals, the first touch action mode in which a touch position change of an object which touches the touch panel is displayed by the line; and performing a second touch action mode by using the touch signals to which the second touch action mode for removing the line which has been displayed in accordance with the first touch action mode among the plurality of lines or for changing a color coordinate of the displayed line has been set, so that it is to perform at least one of the removal of at least a portion of the line displayed in accordance with the first touch action mode and the change of the color coordinate of the line.

When a crossing of the plurality of lines displayed by the first touch action mode is touched by an object for a certain period of time during the performing the second touch action mode, the plurality of lines displayed in accordance with the first touch action mode are removed in reverse order to the displaying order of the lines.

A start point and an end point of at least the removed portion of the line are displayed after the performing of the second touch action mode. The method further includes displaying again the line removed in the second touch action mode by touching an interval connecting the start point with the end point.

In displaying the line, when the lines displayed in accordance with the first touch action mode cross each other, a thickness or color coordinate of the line at a point where the lines cross each other is displayed thicker than a thickness or color coordinate of line at a point where the lines do not cross each other.

The thickness and color coordinate of the line to be displayed are determined by using a pressure signal in the first touch action mode and the second touch action mode.

Further another embodiment is a touch panel control method which performs a first touch action mode in which the change of a touch position of an object is displayed by a line in response to the object which has touched a touch panel, or performs a second touch action mode in which at least a portion of the line displayed by the first touch action mode is removed. The method includes: performing independently the first touch action mode and the second touch action mode respectively in response to mutually different objects, and determining whether or not a touch signal generated by the object corresponds to an input condition of the first touch action mode in which a touch position change of the object is displayed by the line; setting any one of a first touch action mode flag and a second touch action mode flag to the touch signal in accordance with whether or not the touch signal corresponds to the input condition of the first touch action mode; giving the same index to continuous touch signals among the touch signals given the flag, and detecting and distinguishing multiple simultaneous touches to the touch panel in accordance with the index; and setting to perform the first touch action mode by processing the touch signal in accordance with the flag and index or setting to remove at least a portion of the line displayed in the first touch action mode or to change a color coordinate of the line by performing the second touch action mode.

Whether or not the touch signal corresponds to the input condition of the first touch action mode is determined by comparing at least one of a sum of a capacitance change amount of each of sensing cells within the touch region, the number of the sensing cells with the capacitance change amount greater than a predetermined capacitance change amount within the touch region, and the number of the sensing cells of which the capacitance change amount is greater than a predetermined rate of the maximum capacitance change amount or minimum capacitance change amount within the touch region, a ratio of a sum of a predetermined number of the upper capacitance change amounts to a sum of the predetermined number of the lower capacitance change amounts within the touch area.

The second touch action mode is set when the object approaches the touch panel.

When a crossing of the plurality of lines displayed by the first touch action mode is touched by the object for a certain period of time during the performing the second touch action mode, the plurality of lines displayed in accordance with the first touch action mode are removed in reverse order to the displaying order of the lines.

A start point and an end point of at least the removed portion of the line are displayed after the performing of the second touch action mode. The method further includes displaying again the line removed in the second touch action mode by touching an interval connecting the start point with the end point.

In displaying the line, when the lines displayed in accordance with the first touch action mode cross each other, a thickness or color coordinate of the line at a point where the lines cross each other is displayed thicker than a thickness or color coordinate of line at a point where the lines do not cross each other.

The thickness and color coordinate of the line to be displayed are determined by using a pressure signal in the first touch action mode and the second touch action mode.

BRIEF DESCRIPTION OF THE DRAWINGS

FIG. 1c is a schematic view showing another embodiment of the touch panel shown in FIG. 1a;

FIG. 2 is a block diagram showing an embodiment of a controller shown in FIG. 1a;

FIGS. 4a and 4b are views showing the capacitance change amount of each of sensing cells within the touch region at the time of touching the touch panel of the embodiment of the present invention with a stylus pen;

FIGS. 5a and 5b are views showing the capacitance change amount of each of sensing cells within the touch region at the time of touching the touch panel of the embodiment of the present invention with a finger;

DETAILED DESCRIPTION OF THE INVENTION

Figure 1A:
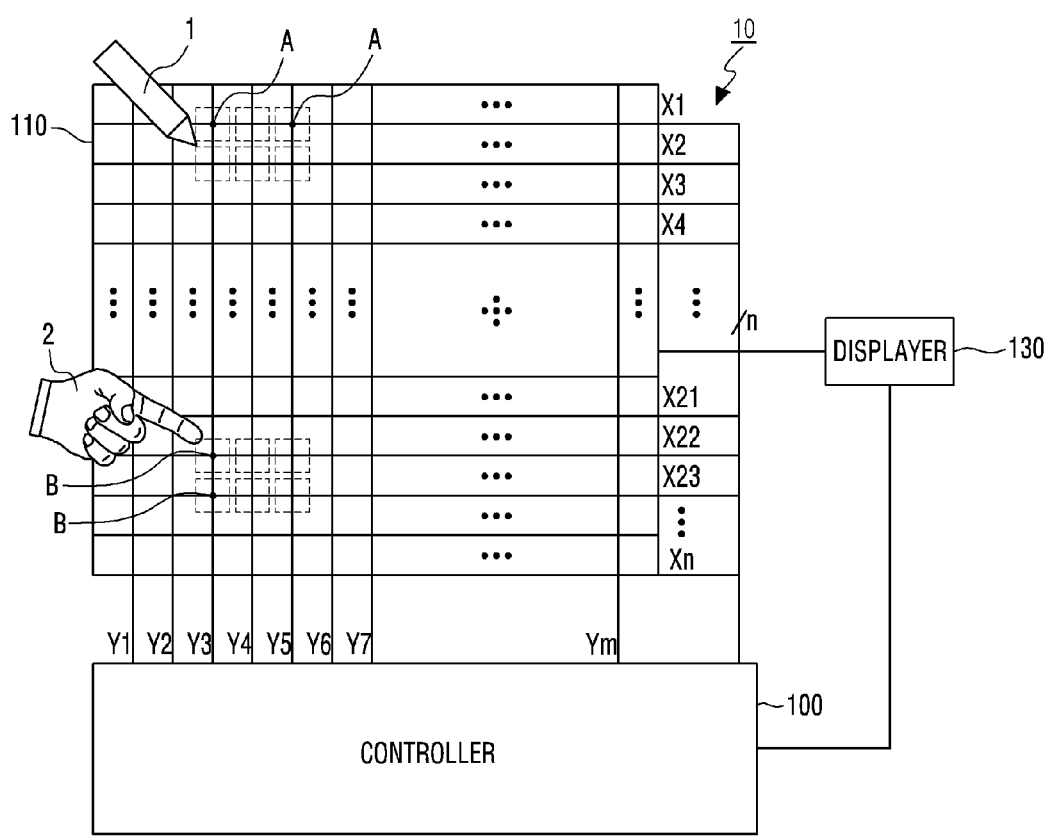
FIG. 1a is a block diagram showing a touch panel control device according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, the embodiment of the present invention will be described in detail with reference to the accompanying drawings.

FIG. 1*a* is a block diagram showing a touch panel control device according to an embodiment of the present invention.

Referring to FIG. 1*a*, the touch panel control device 10 according to the embodiment of the present invention may include a touch panel 110 which generates at least one touch signal in response to the touch of an object, a displayer 130 which displays a line generated by the touch of the object, and a controller 100 which performs a first touch action mode in which the change of the touch position of the object is displayed on the displayer 130 by a line in response to the object which has touched the touch panel, and performs a second touch action mode in which, in response to the position change of the object which corresponds to the position of the line displayed on the displayer 130, it is to carry out at least one of the removal of at least a portion of the line displayed on the displayer 130 and the change of the color coordinate of the line.

The touch panel 110 includes a plurality of drive lines X1, X2, X3, . . . , Xn−1, and Xn arranged in a first direction, a plurality of sensing lines Y1, Y2, Y3, . . . , Ym−1, and Ym arranged to cross the drive lines, and a plurality of sensing cells "A" and "B" formed at the crossings of the drive lines X1, X2, X3, . . . , Xn−1, and Xn and the sensing line Y1, Y2, Y3, . . . , Ym−1, and Ym. Here, although it is shown that the plurality of drive lines X1, X2, X3, . . . , Xn−1, and Xn and the plurality of sensing lines Y1, Y2, Y3, . . . , Ym−1, and Ym are arranged to cross each other, this is just an embodiment. They may be also arranged to cross in the form of other geometrical structures (a concentric line and a radial line of a polar coordinate arrangement), etc. Also, the plurality of drive lines X1, X2, X3, . . . , Xn−1, and Xn and the plurality of sensing lines Y1, Y2, Y3, . . . , Ym−1, and Ym may be disposed on the same plane.

The plurality of the drive lines X1, X2, X3, . . . , Xn−1, and Xn and the plurality of the sensing lines Y1, Y2, Y3, . . . , Ym−1, and Ym are formed on a transparent substrate (not shown). It is preferable that the drive lines and the sensing lines are made of a transparent conductive material. Here, the transparent conductive material may be formed of indium-tin-oxide (ITO), indium-zinc-oxide (IZO) or carbon nano tube (CNT).

Also, an insulation layer (not shown) functioning as a dielectric material may be formed between the plurality of the drive lines X1, X2, X3, . . . , Xn−1, and Xn and the plurality of the sensing lines Y1, Y2, Y3, . . . , Ym−1, and Ym.

When the object touches the touch panel 110 formed as described above, the capacitances of the plurality of sensing cells located at the touch position of the touch panel 110 are changed, so that the touch panel 110 is able to generate a touch signal which copes with the change of the capacitance. The object touching the touch panel 110 may be divided into a first object 1 and a second object 2. The first object 1 may be a stylus pen, and the second object 2 may be a user's finger (hereafter, referred to as a finger).

Figure 1B:
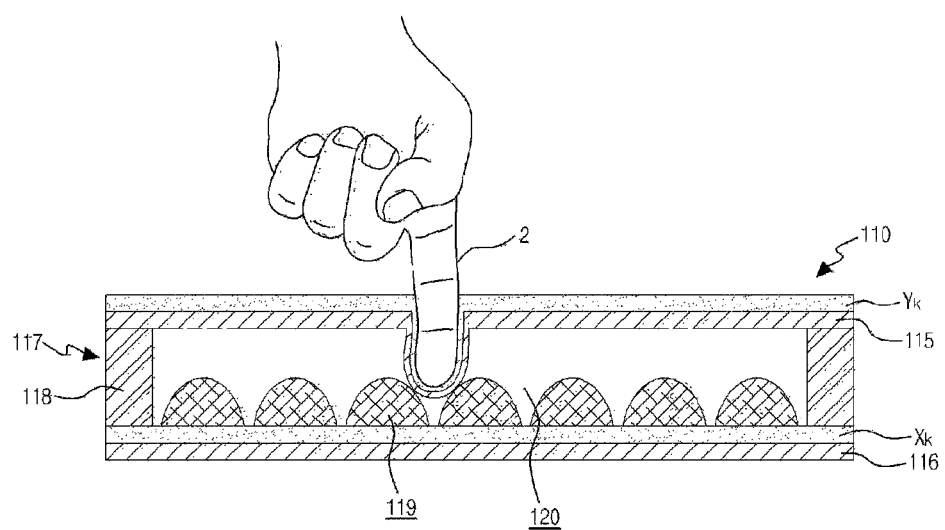
FIG. 1b is a cross sectional view showing a touch panel which senses a pressure in accordance with the embodiment of the present invention.

In the embodiment, the touch panel 110 is able to measure the magnitude of a pressure at which the first object 1 and/or the second object 2 has touched the touch panel 110 in response to the capacitance change between the plurality of drive lines X1, X2, X3, . . . , Xn−1, and Xn and the plurality of sensing lines Y1, Y2, Y3, . . . , Ym−1, and Ym. The structure of the touch panel 110 which detects the pressure applied by the touch may be implemented as shown in FIG. 1*b*.

When the touch panel 110 senses the magnitude of the pressure, a touch area between the touch panel 110 and the first object 1 which has touched the touch panel 110 may be small, and a touch area between the touch panel 110 and the second object 2 which has touched the touch panel 110 may be greater than the touch area between the touch panel 110 and the first object 1. Therefore, the pressure distribution change due to the touch area between the first object 1 and the touch panel 110 may be different from the pressure distribution change due to the touch area between the second object 2 and the touch panel 110. The differences between the pressure distribution changes may be used to determine whether the object is the first object 1 or the second object 2.

Figure 1C:
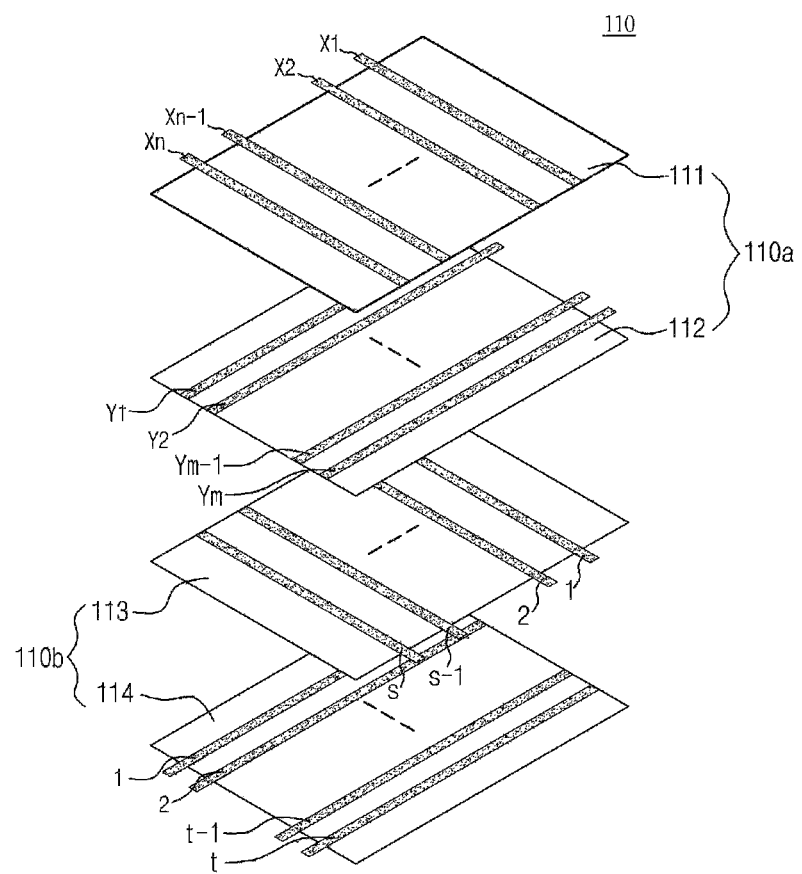

In the embodiment, the touch panel 110 may include, as shown in FIG. 1*c*, two touch panels 110*a* and 110*b*. One touch panel 110*a* may identify the two-dimensional location of the touch, and the other touch panel 110b may identify the magnitude of the touch pressure. When the two touch panels 110a and 110b are overlapped on the same plane, the two touch panels 110a and 110b may be electrically isolated by an insulation layer (not shown) formed therebetween. Also, the order of overlapping the two panels 110a and 110b may be freely determined by a designer. Though it is shown that the sizes of the two panels 110a and 110b are the same as each other, there is no limit to this. The sizes of the two panels 110a and 110b may be different from each other.

The displayer 130 displays the line which is generated by the touch of the object. Here, the line may include not only a straight line and a curved line but also a figure composed of the lines. The displayer 130 may be disposed under the touch panel 110. However, a position where the displayer 130 is disposed is not limited to this. The displayer 130 may be placed physically apart from the touch panel 110. The touch panel 110 may be disposed within the displayer 130. The displayer 130 may be a liquid crystal display or an organic light emitting display device.

The controller 100 may set a first touch action mode or a second touch action mode to the touch signal in response to the capacitance change amount of a valid touch region corresponding to the touch area of the object which touches the touch panel 110 in response to the touch signal, and then may independently perform the modes respectively. In response to the capacitance change amount due to the touch of the object, the controller 100 may determine the pressure applied by the object which has touched the touch panel 110. The controller 100 may set the first touch action mode or the second touch action mode to the touch signal by using the capacitance change amount of the valid touch region, which is generated by the touch signal corresponding to the pressure applied by the object, and may independently perform the modes respectively.

In the first touch action mode, the line can be displayed on the displayer 130. In the second touch action mode, at least a portion of the line displayed on the displayer 130 can be removed or the change of the color coordinate of the line can be carried out. When at least a portion of the line is removed according to the second touch action mode, the length of the line becomes shorter or the width of the line becomes smaller. Also, the entire line may be erased. That is, the second touch action mode may function as an eraser. Also, when the width of the line becomes smaller by removing a portion of the line in accordance with the second touch action mode, an effect may be obtained, in which the line becomes visually lighter. Also, when the color coordinate of the line is reduced according to the second touch action mode, an effect may be obtained, in which the line becomes visually lighter. The reduction of the color coordinate may signify that the saturation and/or brightness of the line are changed. The valid touch region may be composed of the sensing cells belonging to a randomly determined range among the sensing cells where the capacitance change and/or pressure distribution change have occurred by the touch of the object in the touch panel 110. The valid touch region is set as the area where the object has touched the touch panel 110, so that the size of the valid touch region may be changed in response to the change of the size of the touch area. The valid touch region is set as an area composed of the sensing cells within a predetermined distance from the sensing cell having the maximum capacitance change amount, so that the size of the valid touch region may not be changed.

The controller 100 may determine the thickness of the line to be displayed on the displayer 30 in accordance with the first touch action mode in response to the touch area between the object and the touch panel 110. Also, the controller 100 may determine the thickness of the line to be displayed on the displayer 30 in accordance with the first touch action mode in response to the pressure which is applied to the touch panel 110 by the object. Also, the controller 100 may determine the thickness of the line to be erased on the displayer 130 in accordance with the second touch action mode and may determine the color coordinate to be changed of the line by the second touch action mode in response to the touch area between the object and the touch panel 110. Also, the controller 100 may determine the thickness of the line to be erased on the displayer 130 in accordance with the second touch action mode and may determine the color coordinate to be changed of the line in accordance with the second touch action mode in response to the pressure which is applied to the touch panel 110 by the object. The touch area between the object and the touch panel may be determined in response to the size of the valid touch region or may be determined as a predetermined value.

When the first object 1 touches the touch panel 110, the controller 100 performs the first touch action mode, and when the second object 2 touches the touch panel 110, the controller 100 performs the second touch action mode. When the controller 100 performs the first touch action mode and/or the touch action mode and when the first object 1 is a stylus pen and the second object 2 is a finger, the touch area between the first object 1 and the touch panel 110 may be less than the touch area between the second object 2 and the touch panel 110. The capacitance change amounts of the plurality of the sensing cells which the first object 1 has touched may have a distribution different from that of the capacitance change amounts of the plurality of the sensing cells which the second object 2 has touched. Also, the pressure distribution change of the plurality of the sensing cells to which the first object 1 has applied the pressure may be different from the pressure distribution change of the plurality of the sensing cells to which the second object 2 has applied the pressure.

By using such differences, the controller 100 may distinguish between the first object 1 and the second object 2, and may perform the first touch action mode and the second touch action mode, with the distinction of the first touch action mode and the second touch action mode. That is, the controller 100 uses the size of the area composed of the plurality of the sensing cells where the capacitance change and/or the pressure distribution change have occurred by the touch of the object, and thus is able to distinguish the kind of the object which has touched the touch panel 110. Also, the controller 100 sets a portion of the touched portion of the touch panel 110 by the object as the valid touch region, and uses the capacitance change amount and/or the pressure distribution change amount of the set valid touch region, thereby distinguishing the kind of the object which has touched the touch panel 110. How the controller 100 distinguishes the kind of the object will be described in more detail with reference to the following FIGS. 4a, 4b, 5a and 5b.

The controller 100 is able to perform the first touch action mode in which the line is displayed in response to the object. Here, the line may be represented by a line composed of a plurality of dots, a picture and the like. When the object touches only one point during a predetermined time period, the controller 100 may represent the line with dots.

The controller 100 may transmit a driving signal and a sensing signal to the plurality of drive lines X1, X2, X3, . . . , Xn−1, and Xn and the plurality of sensing lines Y1, Y2, Y3, . . . , Ym−1, and Ym of the touch panel 110 respectively, and may recognize, through the sensing signal, a two-dimensional coordinate which has touched the touch panel. Also, the controller 100 may transmit the driving signal and the sensing signal to the plurality of drive lines X1, X2, X3, . . . , Xn−1, and Xn and the plurality of sensing lines Y1, Y2, Y3, . . . , Ym−1, and Ym of the touch panel 110 respectively, and may sense, through the sensing signal, the pressure caused by touching the touch panel.

The controller 100 receives a pressure signal from a pressure sensor 120 and then is able to, in response to the pressure signal, determine the thickness or color coordinate of the line which is displayed in the first touch action mode, and is able to change the thickness of the line which is removed in the second touch action mode or change the color coordinate of the line, which has been displayed in the first touch action mode. The clarity of the line may be increased with the increase of the thickness of the line, and the clarity of the line may be reduced with the decrease of the thickness of the line. Also, the clarity of the line may be increased or reduced according to the color coordinate of the line. Therefore, the thickness and/or of darkness the line which is displayed according to the pressure signal can be determined and the thickness and/or lightness of the remaining line after being removed can be determined. In other words, in accordance with the pressure at which the object touches the touch panel 110, the controller 100 is able to determine how dark the line which is displayed in the first touch action mode is and how light the remaining line after being removed in the second touch action mode is. When the touch panel control device 10 further includes the pressure sensor 120, the controller 100 may further include a pressure sensing unit (not shown) which processes the pressure signal being output from the pressure sensor. Also, the controller 100 may cause the pressure applied to the touch panel 110 by the first object 1 and/or the second object 2 to be displayed on the displayer 130

FIG. 1*b* is a cross sectional view showing the touch panel which senses a pressure in accordance with the embodiment of the present invention.

Referring to FIG. 1*b*, the touch panel 110 may include a spacer layer 117 which leaves a space between the sensing line "Yk" and a third insulation layer 115 so as to efficiently detect the magnitude of the touch pressure. The spacer layer 117 may include a plurality of dot spacers 119. For example, the plurality of the dot spacers 119 may be formed on the sensing line "Yk" and may be composed of a material like nonconductive polyester.

As shown in FIG. 1*b*, the spacer layer 117 may be formed through a double adhesive tape (DAT) of which one side adhering to the sensing line "Yk" and the third insulation layer 115 respectively. That is, the sensing line "Yk" and the third insulation layer 115 are overlapped. Here, the edge portions of the sensing line "Yk" and the third insulation layer 115 are adhered to each other through the double adhesive tape (DAT), so that the two layers may be adhered to each other. The sensing line "Yk" and the third insulation layer 115 may be spaced apart from each other by a predetermined distance in the remaining portion. When the second object 2 touches the touch panel 110, the plurality of drive lines "Xk" and the third insulation layer 115 may be curved concave toward the sensing lines "Yk" in response to the pressure applied by the second object 2. Here, a short-circuit should be prevented from occurring between the drive line "Xk" and the sensing lines "Yk" such that a mutual capacitance is generated between the drive line "Xk" and the sensing lines "Yk". Here, in the embodiment of the present invention, the third insulation layer 115 is able to prevent the drive line "Xk" and the sensing line "Yk" from being short-circuited.

Here, the mutual capacitance between the drive line "Xk" and the sensing line "Yk" may be changed according to the change of the distance between the drive line "Xk" and the sensing line "Yk". In the embodiment of the present invention, in accordance with the change of the mutual capacitance between the drive line "Xk" and the sensing line "Yk", the magnitude of an external pressure 600 can be sensed. In other words, the higher the pressure applied by the object 2, the smaller the distance between the drive line "Xk" and the sensing line "Yk", so that the mutual capacitance change amount may become larger. Likewise, the lower the pressure applied by the object 2, the smaller the degree to which the distance between the drive line "Xk" and the sensing line "Yk" is reduced, so that the mutual capacitance change amount may become smaller. Here, the magnitude of the pressure applied by the object 2 may be represented by the magnitude of the pressure in a downward direction in FIG. 1*b*, that is, in a direction perpendicular and orthogonal to a horizontal plane. Though FIG. 1*b* shows that the object 2which touches the touch panel 110 is the finger, there is no limit to this.

Figure 2:
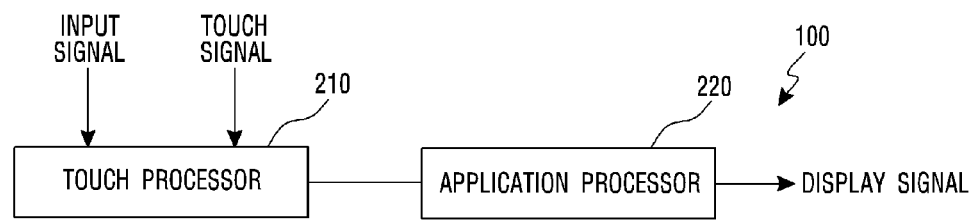

FIG. 2 is a block diagram showing an embodiment of the controller shown in FIG. 1*a*.

Referring to FIG. 2, the controller 100 may include a touch processor 210 and an application processor 220.

The application processor 220 receives the touch signal generated by the touch panel 110 and is able to determine which one of the first object 1 and the second object 2 has touched the touch panel 110. When the first object 1 is a stylus pen and the second object 2 is a finger, the touch area composed of the sensing cells where the capacitance change has occurred by the touch of the first object 1 on the touch panel 110 may be less than the touch area composed of the sensing cells where the capacitance change has occurred by the touch of the first object 2 on the touch panel 110. By using the touch area difference, the touch processor 210 is able to determine whether the first object 1 and/or the second object 2 has touched the touch panel 110. Also, at least a portion of the touched portion of the touch panel 110 by the object is set as the valid touch region, and then the touch processor 210 is able to determine whether the first object 1 and/or the second object 2 has touched the touch panel 110, by using the capacitance change amount of the set valid touch region. The capacitance change amount of the valid touch region may be changed according to the pressure applied to the touch panel 110 by the object.

When the first object 1 has touched the touch panel 110, the touch processor 210 may set the first touch action mode to the touch signal, and when the second object 2 touches the touch panel 110, the touch processor 210 may set the second touch action mode to the touch signal. The touch processor 210 may display the line in the first touch action mode and may remove the line in the second touch action mode. The touch processor 210 may give a different flag to each of the touch signals in the manner of setting the first touch action mode and/or the second touch action mode to the touch signal respectively in response to the object. That is, the touch process 210 may independently give a flag to each of two or more touch signals corresponding to the distinguished object. A flag which is given to the touch signal generated by the first object 1 may be designated as a first touch action mode flag, and a flag which is given to the touch signal generated by the second object 2 may be designated as a second touch action mode flag.

Also, the touch processor 210 gives the same index to the touch signals which satisfy an index matching condition among the touch signals given the flag, and gives a different index to a touch signal which does not satisfy the index matching condition. Accordingly, the touch processor 210 uses the given index, and thus, is able to distinguish a single touch and a dual touch by detecting the plurality of the touches on the touch panel 110. That is, when one touch and another touch are given the same index, the touch processor 210 recognizes them as a single touch, so that the points where the one touch and another touch have occurred may be displayed in one line in the first touch action mode, and the line between the points where the one touch and another touch have occurred may be removed in the second touch action mode. Here, the index matching condition may be obtained by using, for example, a touch input time difference or a distance between the touches, etc.

Also, the touch processor 210 receives the pressure signal from the pressure sensor 120 and gives pressure information to the touch signal in accordance with the pressure, so that the thickness and/or color coordinate of the line which is displayed in the first touch action mode may be determined by the pressure information, and the thickness and/or color coordinate of the remaining line after being removed in the second touch action mode may be determined. The thickness of the line may be determined by the width of the line or by the darkness and lightness of the line.

The application processor 220 may transmit a display signal corresponding to the touch action mode information received from the touch processor 210 to the displayer 130. The displayer 130 is able to display the line or erase the line in accordance with the display signal. In other words, the application processor 220 performs the first touch action mode in which the line corresponding to the change of the touch position of the object is displayed by the touch signal to which the first touch action mode has been set by the touch processor 210, so that the line can be displayed on the displayer 130. The line displayed through the first touch action mode can be represented by a line composed of a plurality of dots, a picture and the like. When the object touches only one point during a predetermined time period, the line may be represented by dots in the first touch action mode. The application processor 220 performs the second touch action mode in which the line displayed on the displayer 130 in response to the change of the touch position of the object is erased by the touch signal to which the second touch action mode has been set, so that at least a portion of the line displayed on the displayer 130 can be erased. The application processor 220 is able to perform the touch signal for performing the first touch action mode and the touch signal for performing the second touch action mode, with distinction of the touch signals by using the flag given to the touch signal by the touch processor 210. The application processor 220 distinguishes the single touch and the dual touch by using the index given to the touch signal by the touch processor 210, thereby causing the line to be displayed or erased.

Figure 3:
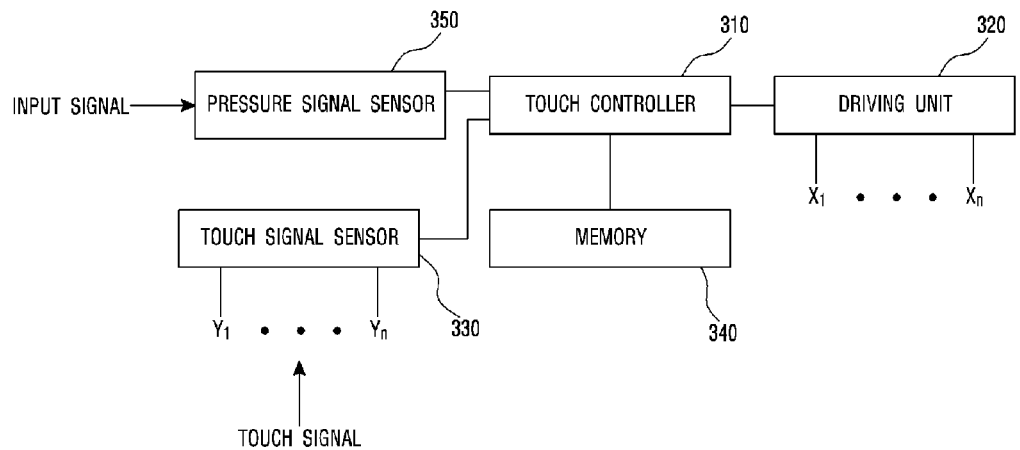
FIG. 3 is a block diagram showing an embodiment of a touch processor shown in FIG. 2.

FIG. 3 is a block diagram showing an embodiment of the touch processor shown in FIG. 2.

Referring to FIG. 3, the touch processor 201 may include a touch controller 310, a driving unit 320, and a touch signal sensor 330.

The touch controller 310 may control the driving unit 320 and the touch signal sensor 330 and independently set the first touch action mode or the second touch action mode respectively by using the touch signal generated in response to the touch on the touch panel 110.

The driving unit 320 is connected to the plurality of drive lines X1, X2, X3, . . . , Xn−1, and Xn of the touch panel 110, and the touch signal sensor 330 is connected to the plurality of sensing lines Y1, Y2, Y3, . . . , Ym−1, and Ym, so that the driving unit 320 and the touch signal sensor 330 may transmit the driving signal and the sensing signal respectively. The driving unit 320 may sequentially apply the driving signal to the plurality of drive lines X1, X2, X3, . . . , Xn−1, and Xn by the control of the touch processor 210. The touch signal sensor 330 transmits the sensing signal to the sensing lines Y1, Y2, Y3, . . . , Ym−1, and Ym by the control of the touch processor 210 and may receive the touch signal corresponding to the capacitance change sensed by each of the sensing cells. For the purpose of clearly distinguish the touch signal from touch errors like hovering, noise, etc., the touch signal sensor 330 may analyze the signal input from the touch panel 110 by means of a predetermined threshold value.

In the embodiment, the touch processor 210 may further include a memory 340. The memory 340 may be connected to the touch controller 310. The memory 340 may store a program to drive the touch processor 210 or may store the flag and/or index. The memory 340 may also store firmware, etc. The memory 340 may store information on the valid touch area of the object so as to at least distinguish the first touch action mode and the second touch action mode. The area information on the valid touch region may be the number of the sensing cells in which the capacitance change occurs due to the touch. Also, the area information may be the size of the valid touch region, the type the capacitance change of the plurality of sensing cells within the valid touch region, and the like. The memory 340 may store information on the shape of the plurality of valid touch regions. The touch processor 210 is able to determine whether the valid touch occurs or not by using the shape information stored in the memory 340. Through use of the information on the shape composed of the plurality of valid touches, when the shape of the valid touch is like user's palm, the touches included in the shape of the valid touch is caused not to be recognized as the valid touch. Here, though it is shown that the memory 340 is included in the touch processor 210, there is no limit to this. The memory 340 can be included in the application processor 220. That is, the memory 340 can be disposed within the controller 100.

In the embodiment, the touch processor 210 may further include a pressure signal sensor 350. The pressure signal sensor 350 receives the pressure signal from the pressure sensor 120 and is able to determine, in response to the pressure signal, the thickness and/or color coordinate of the line which is displayed in accordance with the first touch action mode. Also, the pressure signal sensor 350 receives the pressure signal from the pressure sensor 120 and is able to determine, in response to the pressure signal, the thickness of the line which is erased in accordance with the second touch action mode and/or the color coordinate of the remaining line. The pressure signal sensor 350 may display the pressure at which the object touches the touch panel 110. The memory 340 may further store information on the thickness and/or color coordinate of the line, which correspond to the pressure signal generated from the pressure sensor 120.

FIGS. 4a and 4b are views showing the capacitance change amount of each of the sensing cells within the touch region at the time of touching the touch panel of the embodiment of the present invention with a stylus pen. FIGS. 5a and 5b are views showing the capacitance change amount of each of the sensing cells within the touch region at the time of touching the touch panel of the embodiment of the present invention with a finger.

Here, FIGS. 4a and 5a show respectively that one sensing cell has the maximum capacitance change amount within the touch region. FIGS. 4b and 5b show respectively that two or more sensing cell have the maximum capacitance change amount within the touch region.

The following table 1 shows that the controller 100 distinguishes the kind of the object.

TABLE 1

|  | FIG. 4a | FIG. 4b | Threshold Value | FIG. 5a | FIG. 5b |
|---|---|---|---|---|---|
| sum of capacitance change amount | 152 | 141 | 180 | 260 | 226 |
| the number of sensing cells of which the capacitance change amount is greater than 20 | 1 | 2 | 3 | 5 | 6 |
| the number of the sensing cells of which the capacitance change amount is equal to or greater than 25% of the maximum capacitance change amount | 0 (>25) | 1 (>12.5) | 3 | 4 (>25) | 5 (>12.5) |
| a sum of four upper capacitance change amounts/ a sum of four lower capacitance change amounts | 10.8 (130/12) | 6.8 (116/17) | 6 | 4.75 (190/40) | 2.9 (150/51) |

The description will be provided with reference to FIGS. 4a, 4b, 5a and 5b and the table 1.

The controller 100 compares the sum of the capacitance change amount, and then distinguishes the kind of the object which has touched the touch panel. The controller 100 is able to distinguish the kind of the object by comparing the number of the sensing cells of which the capacitance change amount is greater than a predetermined capacitance change amount within the touch region. The controller 100 is able to distinguish the kind of the object by comparing the number of the sensing cells of which the capacitance change amount is greater than a predetermined rate of the maximum capacitance change amount or minimum capacitance change amount within the touch region. The controller 100 is able to distinguish the kind of the object by comparing a ratio of a sum of a predetermined number of the upper capacitance change amounts to a sum of the predetermined number of the lower capacitance change amounts within the touch region.

First, the method in which the controller 100 distinguishes the kind of the object by comparing the sum of the capacitance change amount of each of the sensing cells within the touch region will be described. The controller 100 finds out the sum of the capacitance change amount of the sensing cells within the touch region. When the sum of the capacitance change amount is less than a threshold value, it is determined that the kind of the object which has touched the touch panel is the stylus pen, i.e., the first object 1. When the sum of the capacitance change amount is greater than a threshold value, the kind of the object which has touched the touch panel is the finger, i.e., the second object 2. The threshold value may be assumed to be 180. For example, when, as shown in FIG. 4a, the sum is 152 (=100+10+10+ 10+10+3+3+3+3), or when, as shown in FIG. 4b, the sum is 141(=50+50+8+8+8+8+5+2+2), it is determined that the first object 1 has touched. When, as shown in FIG. 5a, the sum is 260 (=100+30+30+30+30+10+10+10+10), or when, as shown in FIG. 5b, the sum is 226 (=50+50+25+25+ 25+10+8+8), it is determined that the second object 2 has touched.

The method in which the controller 100 distinguishes the kind of the object by comparing the number of the sensing cells of which the capacitance change amount is greater than a predetermined capacitance change amount within the touch region will be described. The controller 100 may set the predetermined capacitance change amount as 20 and may assume the threshold value of the number of the sensing cells of which the capacitance change amount is greater than 20 to be 3. When the number of the sensing cells of which the capacitance change amount is greater than 20 within the touch region is less than 3, the controller 100 may determine that the object which has touched the touch panel is the stylus pen, i.e., the first object 1, and when the number of the sensing cells of which the capacitance change amount is greater than 20 within the touch region is greater than 3, the controller 100 may determine that the object which has touched the touch panel is the finger. For instance, when the number of the sensing cells of which the capacitance change amount is greater than 20 is less than the threshold value of 3 and is 1 (100) as shown in FIG. 4a or is 2 (50, 50) as shown in FIG. 4b, the controller 100 may determine that the first object 1 has touched. When the number of the sensing cells of which the capacitance change amount is greater than 20 within the touch region is greater than the threshold value of 3 and is 5 (30, 30, 30, 30, 100) as shown in FIG. 5a or is 6 (25, 25, 25, 25, 50, 50) as shown in FIG. 5b, the controller 100 may determine that the second object 2 has touched.

The method in which the controller 100 distinguishes the kind of the object by comparing the number of the sensing cells of which the capacitance change amount is greater than a predetermined rate of the maximum capacitance change amount or minimum capacitance change amount within the touch region will be described. The controller 100 may set the predetermined ratio as 25% and may assume the threshold value of the number of the sensing cells of which the capacitance change amount is greater than 25% of the maximum capacitance change amount within the touch region to be 3. When the number of the sensing cells of which the capacitance change amount is less than the threshold value within the touch region, the controller 100 may determine that the object which has touched the touch panel is the stylus pen, i.e., the first object 1, and when the number of the sensing cells of which the capacitance change amount is greater than the threshold value within the touch area, the controller 100 may determine that the object which has touched the touch panel is the finger, i.e., the second object 2. For example, when the number of the sensing cells of which the capacitance change amount is greater than 25% of the maximum capacitance change amount within the touch area is 0 as shown in FIG. 4a or is 1 (50) as shown in FIG. 4b, the controller 100 may determine that the first object 1 has touched. When the number of the sensing cells of which the capacitance change amount is greater than 25% of the maximum capacitance change amount within the touch region is 4 as shown in FIG. 5a or is 5 as shown in FIG. 5b, the controller 100 may determine that the second object 2 has touched.

The method in which the controller 100 distinguishes the kind of the object by comparing a ratio of a sum of a predetermined number of the upper capacitance change amounts to a sum of the predetermined number of the lower capacitance change amounts within the touch region will be described. When the predetermined number is set as 4 and the ratio of the sum of four upper capacitance change amounts within the touch region to the sum of four lower capacitance change amounts within the touch region is greater than a threshold value of 6, the controller 100 may determine that the object which has touched the touch panel is the stylus pen, i.e., the first object 1, and when the ratio of the sum of four upper capacitance change amounts within the touch area to the sum of four lower capacitance change amounts within the touch area is less than the threshold value of 6, the controller 100 may determine that the object which has touched the touch panel is the finger, i.e., the second object 2. For example, when the ratio is 10.8 (=130÷12) as shown in FIG. 4a, or the ratio is 6.8 (=116÷17) as shown in FIG. 4b, the controller 100 may determine that the first object 1 has touched. When the ratio is 4.75 (=190÷40) as shown in FIG. 5a, or the ratio is 2.9 (=150÷51) as shown in FIG. 5b, the controller 100 may determine that the second object 2 has touched.

The threshold value of each of the foregoing methods may be adjusted to distinguish the objects. Also, though it is shown in FIGS. 4a to 5b that the size of the valid touch region is 3, this is just an example. The size of the valid touch region may be greater than 3. The size of the valid touch region may be changed according to the kind of the object touching the touch panel 110. Also, the size of the valid touch region may be changed according to the touch area between the object and the touch panel 110. The touch area between the object and the touch panel 110 can be distinguished by using the difference between the capacitance change amounts.

Figure 6:
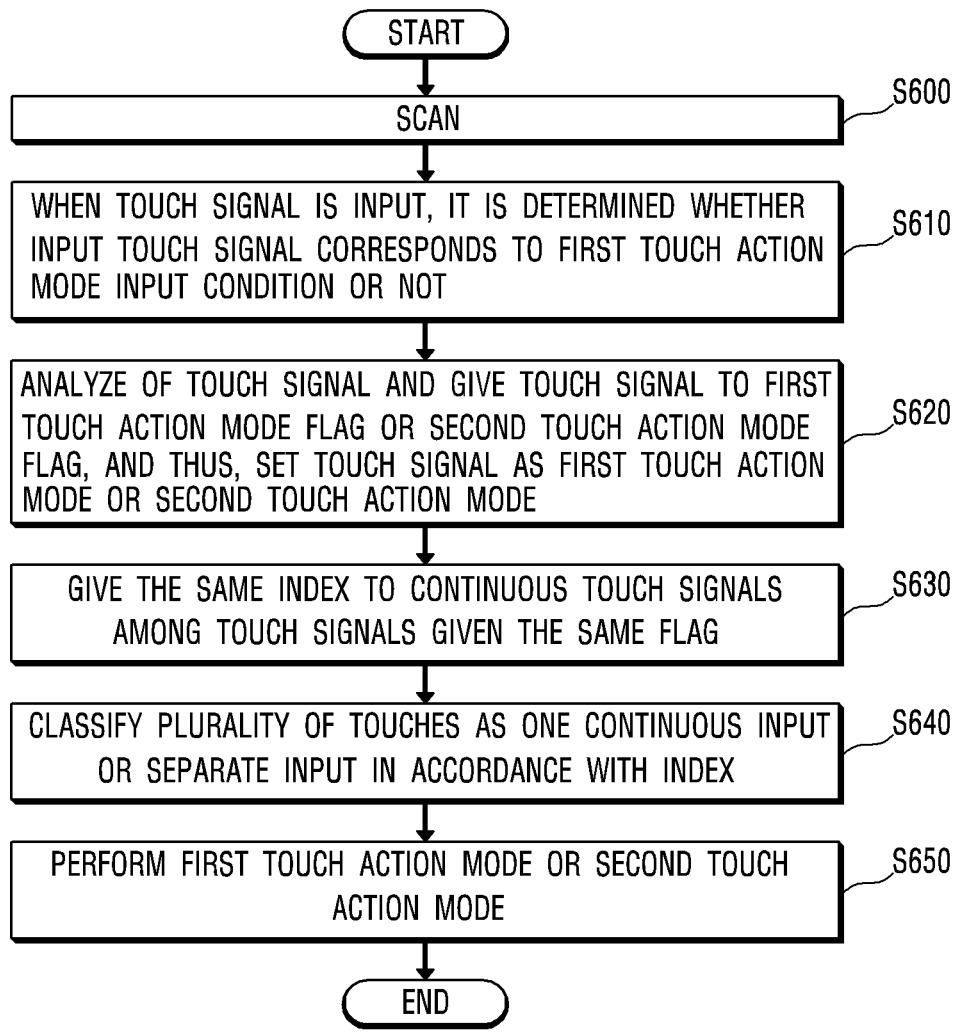
FIG. 6 is a flowchart showing an embodiment of a touch panel control method of the touch panel control device according to the embodiment of the present invention.

FIG. 6 is a flowchart showing an embodiment of a touch panel control method of the touch panel control device according to the embodiment of the present invention. The touch panel control method of the touch panel control device according to the embodiment of the present invention can be performed by the operation of the controller 100.

As shown in FIG. 6, the method for controlling the touch panel 110 is performed as follows. Scanning is performed whether the touch signal is input to the touch panel 110 or not (S600). The scanning is performed by sensing the mutual capacitance changes of the sensing cells formed by the plurality of the drive lines and the plurality of the sensing lines, so that the touch input is distinguished from hovering, noise, etc., by using the sensed change amount, a threshold value, etc. When it is determined that a touch signal is input, it is determined whether the input touch signal corresponds to a first touch action mode input condition or not (S610). Then, through the analysis of the touch signal, a first touch action mode flag or a second touch action mode flag is given to the touch signal (S620). That is, when the touch signal corresponds to the first touch action mode input condition, the first touch action mode flag is given to the touch signal, and when the touch signal does not correspond to the first touch action mode input condition, the second touch action mode flag is given to the touch signal. In response to the given flag, the touch signal may be set as the first touch action mode or the second touch action mode.

Also, each of the first and the second touch action modes may give the same index to continuous touch signals among the touch signals given the same flag (S630), and may classify the plurality of the touches input to the touch panel 110 as one continuous input or a separate input in accordance with the index (S640). That is, the plurality of the touch inputs given the same index can be recognized as a single touch and be represented to be connected to each other.

The touch signal is processed according to the flag and index, and then the line is displayed by performing the first touch action mode. Otherwise, by performing the second touch action mode, at least a portion of the line displayed in the first touch action mode can be removed or the color coordinate of the line can be changed (S650).

In the embodiment, though the processes S610 to S620 related to the operation to give the flag and the process S630 related to the operation to give the index have been sequentially described, the processes may be performed in a reverse direction to the above-mentioned direction. Therefore, the concept of the present invention is not limited to the sequential relationship between the processes S610 to S620 related to the operation to give the flag and the process S630 related to the operation to give the index.

Accordingly, at least one touch signal parameter, for example, a sum of the capacitance change amount of each of the sensing cells within the touch region, the number of the sensing cells with the capacitance change amount greater than a predetermined capacitance change amount within the touch region, and the number of the sensing cells of which the capacitance change amount is greater than a predetermined rate of the maximum capacitance change amount or minimum capacitance change amount within the touch region, a ratio of a sum of a predetermined number of the upper capacitance change amounts to a sum of the predetermined number of the lower capacitance change amounts within the touch region, etc., is compared with the threshold value by use of the characteristics of the capacitance change amount of the touched object, so that it is possible to determine the touch input conditions of which of the objects are satisfied by the valid touch.

Figure 7:
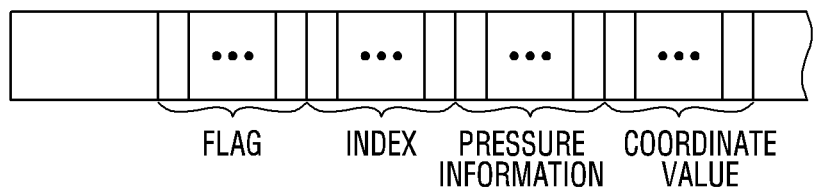
FIG. 7 is a schematic view showing a data format of a touch signal.

FIG. 7 is a schematic view showing a data format of the touch signal.

Referring to FIG. 7, the data format of the touch signal given the flag may be composed of the flag field and coordinate value field. Also, the data format of the touch signal given the index may be composed of the flag field, index field and coordinate value field. Also, the data format of the touch signal given the pressure information may be composed of the flag field, index field, pressure information field, and coordinate value field.

Figure 8:
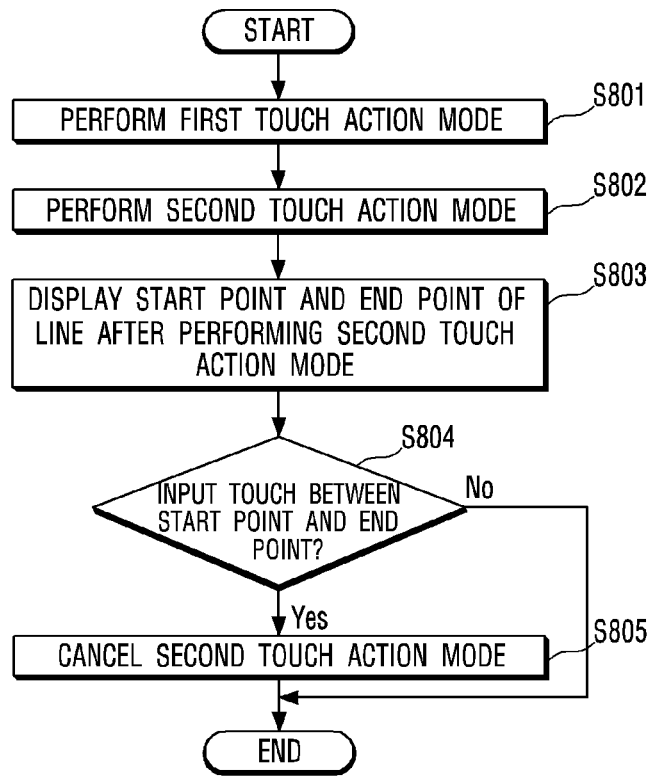
FIG. 8 is a flowchart showing a process of performing a first touch action mode and a second touch action mode by the controller shown in FIG. 1*a*.

FIG. 8 is a flowchart showing a process of performing the first touch action mode and the second touch action mode by the controller shown in FIG. 1a.

Referring to FIG. 8, the process of performing the first touch action mode and the second touch action mode by the controller will be described. The controller 100 may display at least one line by using the touch signals to which the first touch action mode for displaying the line has been set among a plurality of touch signals (S801).

In the embodiment, in displaying the line, when the lines displayed in accordance with the first touch action mode cross each other, the controller 100 causes the thickness or color coordinate of the line at the point where the lines cross each other to be displayed thicker than the thickness or color coordinate of line at a point where the lines do not cross each other. That is, the controller 100 stores the coordinate value of the line displayed on the displayer 130. When the touch signal for the lines having at least some of the same coordinate value among the stored coordinate values is input, the controller 100 may determine that the mutually different lines have crossed each other at the portion which has the same coordinate value. The controller 100 may cause the thickness of the point where the lines cross each other to be larger than that of the point where the lines do not cross each other. The coordinate value of the line displayed on the displayer 130 may be stored in the memory 340.

The controller 100 performs the second touch action mode by using the touch signals to which the second touch action mode for removing the line which has been displayed in accordance with the first touch action mode among the plurality of lines or for changing the color coordinate of the displayed line has been set, so that it is possible to perform at least one of the removal of at least a portion of the line displayed in accordance with the first touch action mode and the change of the color coordinate of the line (S802).

In the embodiment, during the performing of the second touch action mode, the plurality of lines displayed in accordance with the first touch action mode may be removed in reverse order to the displaying order of the lines. For this, the controller 100 may store information on the generation order of the plurality of lines and may remove the plurality of displayed lines in the reverse order by using the order information.

In the embodiment, after the performing of the second touch action mode, the start point and the end point of at least a removed portion of the line may be displayed (S803). The controller 100 may store the coordinate value of the at least portion of the line, which has been removed after the performing of the second touch action mode, and may cause the start point and the end point to be displayed by using the coordinate value corresponding to the start point and the end point of the removed line.

In the embodiment, the process of performing the modes may further include touching an imaginary straight line connecting the start point with the end point (S804) and displaying again the line removed in the second touch action mode when touching the imaginary straight line (S805). When a touch connecting the start point with the end point of the removed line occurs, the controller 100 may cause the removed line to be displayed again by using the stored information on the coordinate value of the removed line.

The above process is applied to a portion of the line, which has the color coordinate changed in the second touch action mode. The controller 100 may store the coordinate value information of the portion of the line, which has the changed color coordinate and may cause the start point and the end point of the line which has the changed color coordinate to be displayed by using the coordinate value. Also, when a touch connecting the start point with the end point of the line which has the changed color coordinate occurs, the controller 100 is able to restore again the changed color coordinate of the line by storing the coordinate value of the line which has the changed color coordinate and by using the coordinate value information.

In the embodiment, the first touch action mode and the second touch action mode are processed by the touch processor 210 of the controller 100 and may be displayed on the displayer 130.

Figure 9A:
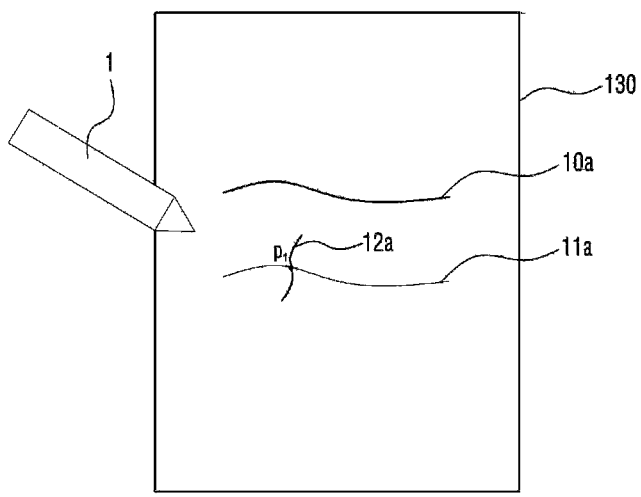
FIGS. 9*a* to 9*c* are conceptual views showing a first embodiment of how the controller shown in FIG. 1*a* displays a line on a displayer.
Figure 9B:
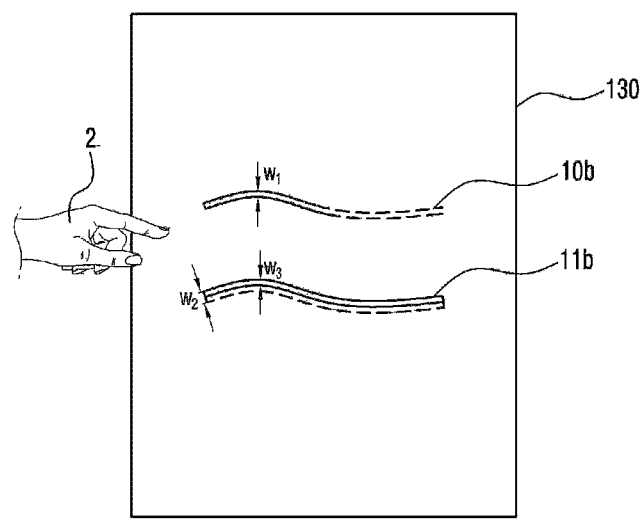
Figure 9C:
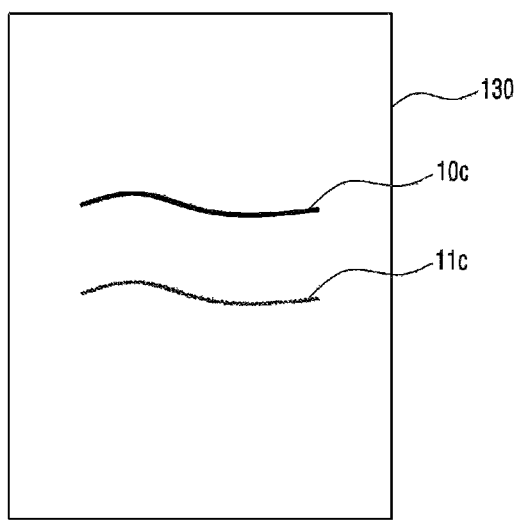

FIGS. 9a to 9c are conceptual views showing a first embodiment of how the touch processor shown in FIG. 1a displays a line on a displayer.

Referring to FIGS. 9a to 9c, as shown in FIG. 9a, the controller 100 may cause certain lines 10a, 11a, and 12a to be displayed on the displayer 130 in accordance with the first touch action mode. The controller 100 may control the thickness of the line which is displayed on the displayer 130. The thickness of the line may be determined by sensing the pressure applied to the touch panel 110. That is, when a high pressure is applied to the touch panel 110 by the object, the line may be displayed thick like the line 10a, and when a low pressure is applied to the touch panel 110 by the object, the line may be displayed thinly like the line 11a. The lines displayed on the displayer 130 may cross each other like the lines 11a and 12a. When the lines 11a and 12a cross each other, the crossing P1 may be displayed thicker than a point where the lines do not cross each other. The thickness of the crossing P1 may be determined by summing the thicknesses of the one line 11a and the other line 12a crossing the line 11a. In other words, the thickness of the crossing P1 may be determined by using the sum of the pressure applied to the touch panel 110 when the line 11a is displayed and the pressure applied to the touch panel 110 when the line 12a is displayed. As shown in FIG. 9b, the controller 100 may shorten a line 10b by removing a portion of the line 10b in accordance with the second touch action mode without changing a line width "w1" (the removed portion is indicated by a dotted line). It is also possible to reduce the width by removing a portion of the line like a line 11b. In a case where the very thick line 11b is erased by using the finger, i.e., the second object 2, when a high pressure is applied to the touch panel, the thickness of the line 11b can be reduced from a first thickness "w2" to a second thickness "w3" by applying a low pressure. The thinner line may look blurry. As shown in FIG. 9c, the line may be displayed light by the second touch action mode. The line is removed through the second touch action mode. When a high pressure is applied to the touch panel by the object, the entire line displayed on the displayer 130 can be removed. However, when a low pressure is applied to the touch panel 110 by the object which causes the second touch action mode to be performed, the line displayed on the displayer 130 can be lighter. That is, when the line 10c displayed in the upper portion of the displayer 130 in the first touch action mode becomes lighter, the line 10c can be as light as the line 11c displayed in the lower portion of the displayer 130. The fact that a low pressure is applied to the touch panel 110 by the object means that the pressure applied to the touch panel 110 in accordance with the second touch action mode is less than the pressure applied to the touch panel 110 in accordance with the first touch action mode. The line can be lighter by adjusting the color coordinate of the line.

During the performing the second touch action mode, when the crossing of the plurality of lines is touched by the second object for a certain period of time, the controller 100 is able to cause the plurality of lines displayed in accordance with the first touch action mode to be removed in reverse order to the displaying order of the lines. Accordingly, the displayed line can be easily removed even without touching a particular position.

FIGS. 10a to 10d are conceptual views showing a second embodiment of how the controller shown in FIG. 1a displays a line on the displayer.

Figure 10A:
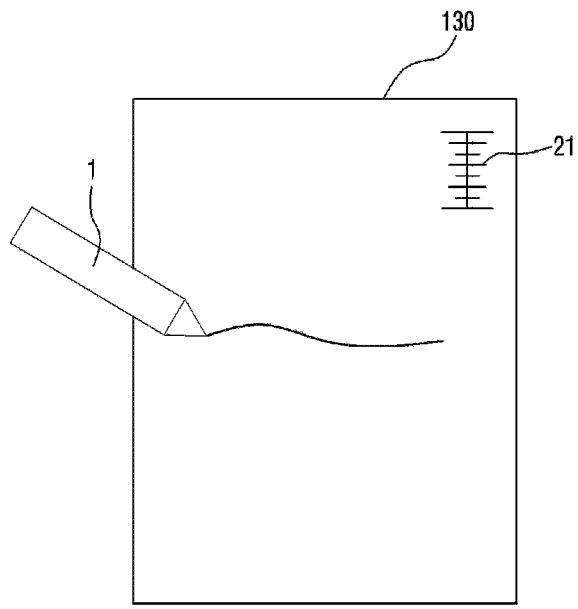
FIGS. 10*a* to 10*d* are conceptual views showing a second embodiment of how the controller shown in FIG. 1*a* displays a line on the displayer.
Figure 10B:
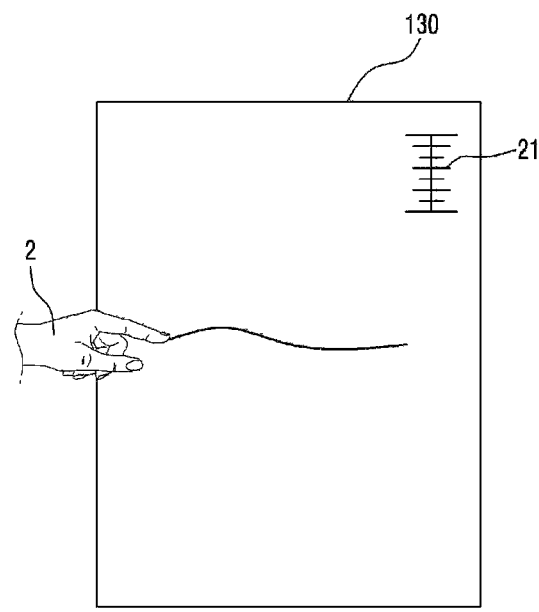
Figure 10C:
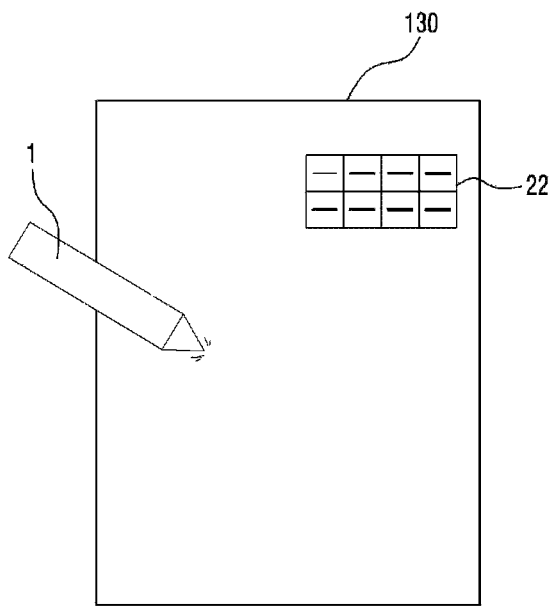
Figure 10D:
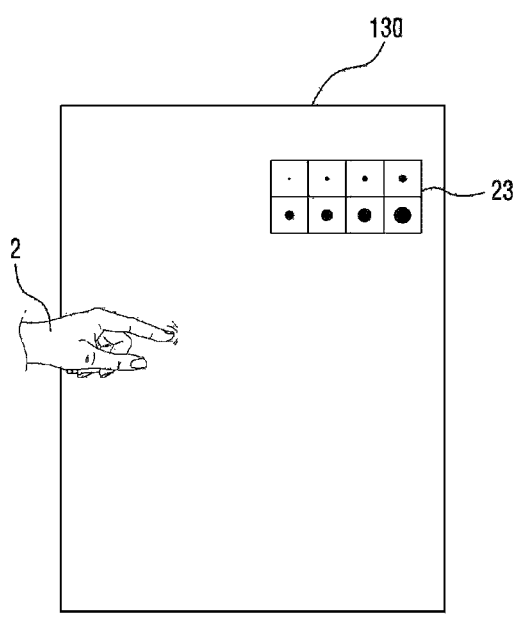

As shown in FIGS. 10a and 10b, the controller 100 may cause a pressure gauge 21 to be displayed on one side of the displayer 130 by using a pressure information field of the touch signal, which corresponds to the pressure signal of the pressure sensor 120. In the embodiment, the application processor 220 included in the controller 100 may cause the pressure gauge 21 to be displayed on one side of the displayer 130. Through use of the pressure gauge 21, the user is able to recognize the pressure applied to the touch panel by the object. The pressure gauge 21 is displayed with scales. However, there is no limit to this. The pressure gauge 21 may be displayed in the form of a bar and the pressure may be displayed in response to the length of the bar. Also, as shown in FIGS. 10c and 10d, the controller 100 may cause a window 22 and 23 to be displayed on one side of the displayer 130, instead of the pressure gauge 21. The window 22 and 23 displays the thickness of the line to be displayed in response to the pressure signal or the size of the eraser which erases the line. The window 22 and 23 displays the plurality of lines having mutually different thicknesses or a plurality of erasers having mutually different sizes. The window 22 and 23 displays that one of the plurality of lines is selected or one of the plurality of erasers is selected in response to the pressure signal. However, there is no limit to this. One line or one eraser may be displayed on the window 22 and 23, and the thickness of the line or the size of the eraser may be adjusted in response to the pressure signal. That is, according to a level of the pressure which is applied to the window 22 and 23, and the thickness of the line to be displayed may be changed and displayed or the size of the eraser may be changed and displayed. The pressure signal may be identified by using the pressure information field of the touch signal. FIGS. 10a and 10b show that the pressure gauge 21 is displayed on the displayer 130, so that the user is allowed to draw or erase the line with a guess of the thickness of the line or the size of the eraser through the pressure gauge. FIGS. 10c and 10d show that the window 22 and 23 displaying the thickness of the line or the size of the eraser is displayed on one side of the displayer 130, so that the user is allowed to draw or erase the line with reference to the line or eraser displayed on the window 22 and 23. Though it is described in the foregoing that the thickness of the line is adjusted in response to the pressure signal, there is no limit to this. The color coordinate of the line is changed in response to the pressure signal, so that the darkness and lightness of the line can be adjusted.

Figure 11:
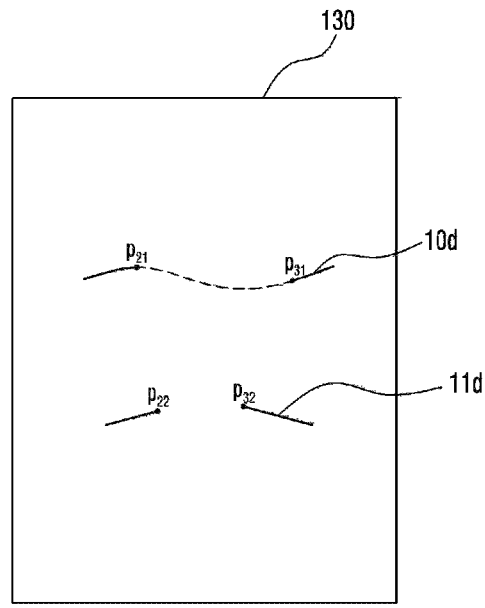
FIG. 11 is a conceptual view showing a third embodiment of how the controller shown in FIG. 1*a* displays a line on the displayer.

FIG. 11 is a conceptual view showing a third embodiment of how the controller shown in FIG. 1a displays a line on the displayer.

Referring to FIG. 11, when at least a portion of a line 10d is removed through the second touch action mode after the line 10c is displayed on the displayer 130 through the first touch action mode, the controller 100 may cause the removed portion to be indicated by a dotted line, and the user is allowed to restore the removed portion by touching the shortest distance between the start point P21 and the end point P31 of the removed line. The removed portion can be restored by displaying all of the signals having the same index through use of the index field included in the touch signal. When the information on the coordinate value of the removed portion is stored in the memory 340 and a restoration signal is generated by the controller 100, the line can be restored by using the information on the coordinate value of the removed portion stored in the memory 340. When at least a portion of a line 11d is removed through the second touch action mode after the line 11d is displayed on the displayer 130 through the first touch action mode, the removed portion of the line 11d is not displayed and the start point P22 and the end point P31 of the removed portion are displayed thicker or flickeringly. The user touches the shortest distance between the start point P22 and the end point P31 of the line 11d, so that the removed portion is restored.

The touching the shortest distance between the start point P21 and the end point P31 may mean moving while touching the entire or a portion of the shortest distance between the start point P21 and the end point P31 or may mean touching only the start point P21 and the end point P31.

When the touch occurs on the touch panel for the purpose of the restoration, the first object 1 and the second object 2 may not be distinguished.

Figure 12:
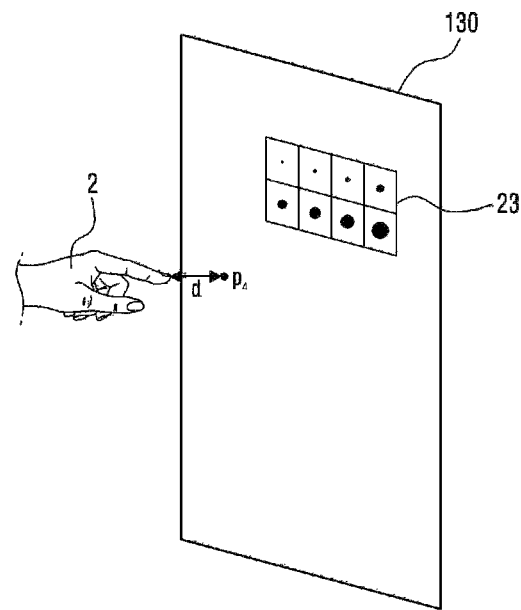
FIG. 12 is a conceptual view showing how to determine the size of an eraser by using hovering.

FIG. 12 is a conceptual view showing how to determine the size of an eraser by using hovering.

Referring to FIG. 12, when the object is located above one point P4 within a certain distance without directly touching the touch panel 110, the capacitance of a portion composed of the sensing cells corresponding to the point P4 may be changed. This phenomenon is called hovering. The controller 100 is able to determine whether the hovering occurs or not by using the capacitance change amount of the sensing cells. Therefore, when the user hovers over the touch panel 110 for a certain period of time by means of the second object 2, i.e., finger, the controller 100 may recognize the hovering and may cause a window 23 on which the plurality of different-sized erasers are displayed to be displayed on one side of the displayer 130. The user may select the size of the eraser by touching one of the plurality of erasers in the window 23 by means of his/her finger. The controller 100 may determine the width of the line, which is erased during the performing of the second touch action mode, by using the selected size of the eraser. When the touch occurs on the touch panel 110 by the second object 2, the controller 100 performs the second touch action mode, so that the lines displayed on the displayer 130 can be erased in response to the size of the eraser. Here, the eraser is selected by the hovering and then the touch panel 110 is touched by the first object, i.e., stylus pen instead of the second object 2, the controller 100 recognizes through the information on the capacitance change amount that the first object 1 instead of the second object 2 has touched the touch panel, so that the first touch action mode is performed. Therefore, the line is not erased but displayed on the displayer 130.

Figure 13:
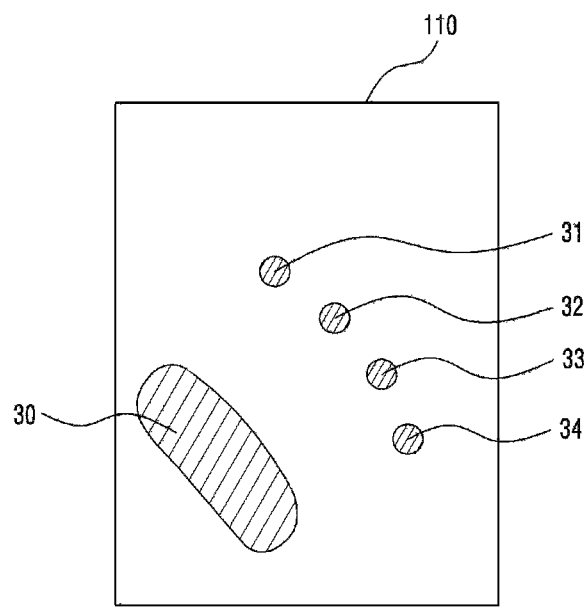
FIG. 13 is a conceptual view showing that a touch shape obtained by touching the touch panel shown in FIG. 1*a*.

FIG. 13 is a conceptual view showing that a touch shape obtained by touching the touch panel shown in FIG. 1a.

Referring to FIG. 13, the user may touch the touch panel 110 by using the first object 1, i.e., stylus pen or the second object 2, i.e., finger, while holding a device equipped with the touch panel 110 by his/her hand. Here, palm, etc., may touch the touch panel 100. The touch area 30 between the palm and the touch panel 110 may be distributed more widely. Portions where touch occurs by the first object 1 or the second object 2 may be arranged in the form of small dots 31, 32, 33, and 34. That is, unlike the shape of the touched portion of the touch panel 110 by the first object 1 or the second object 2, the touched portion of the touch panel 110 by the palm may be distribute more widely. Through use of such a shape difference, the controller 100 may exclude a portion of the touch panel 110, which the user has touched with the palm by mistake. Also, when the user does not use the first object 1, the user may place the first object on the touch panel 110. In this case, the touch shape may be displayed in the form of a line. When the controller 100 stores the information on the touch shape, the controller 100 may not recognize unnecessary touches. The controller 100 may store the touch shape information in the memory 340.

Figure 14:
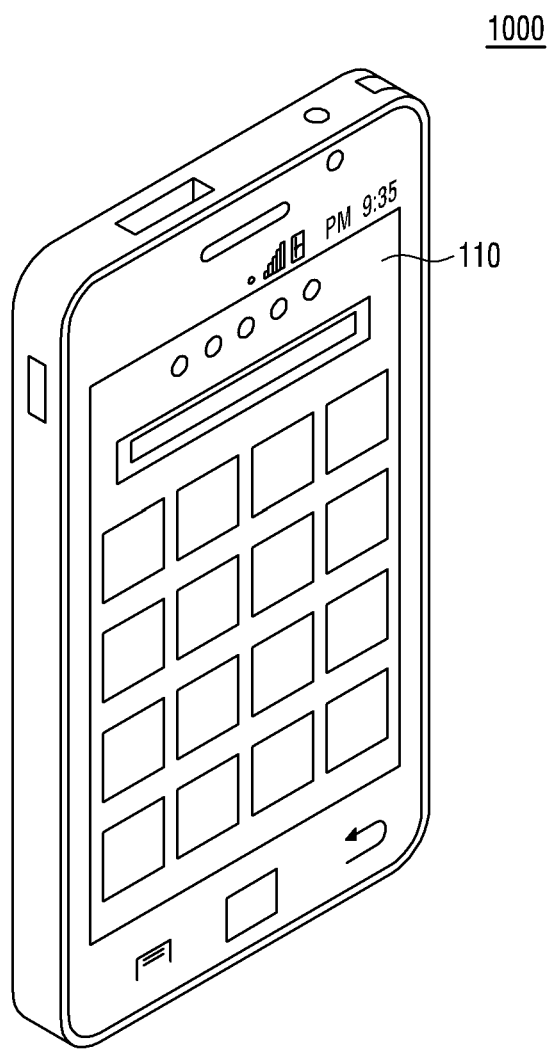
FIG. 14 is a perspective view showing an electronic device equipped with the touch panel control device according to the embodiment of the present invention.

FIG. 14 is a perspective view showing an electronic device equipped with the touch panel control device according to the embodiment of the present invention.

As shown in FIG. 14, the touch panel control device according to the embodiment of the present invention may be applied to an electronic device 1000 such as a cellular phone including the touch panel 110. Since the touch panel control device according to the embodiment processes at least two touch action modes independently and respectively in accordance with the object which has touched the touch panel 110, thereby being advantageous for improving the efficiency of the electronic device 1000 that implements various functions at the same time.

Here, the electronic device 1000 is not limited to the cellular phone shown in FIG. 14. For example, the electronic device 1000 may include a variety of electronic devices, e.g., a mobile electronic device, a laptop computer, a portable computer, a portable multimedia player (PMP), a camcorder, a web tablet, a car navigation system, a personal digital assistant (PDA), and the like.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch panel control device comprising:
 a touch panel which generates at least one touch signal in response to a touch of an object;
 a displayer; and
 a controller which performs a first touch action mode in which a change of the touch position of the object is displayed on the displayer by a line in response to the object which has touched the touch panel, and performs a second touch action mode which, in response to a position change of the object which corresponds to a position of the line displayed on the displayer, includes at least one of removing at least a portion of the line displayed on the displayer and changing the color coordinate of the line;
 wherein the controller comprises a touch processor and an application processor;
 wherein the touch processor independently sets the first touch action mode or the second touch action mode in response to a capacitance change amount of a valid touch region corresponding to at least one of a touch area of the object which touches the touch panel in response to the at least one touch signal and a distribution of a pressure which the object applies to touch panel in response to the at least one touch signal; and
 wherein the application processor performs the first touch action mode by a first touch signal of the at least one touch signal to which the first touch action mode has been set and performs the second touch action mode by a second touch signal of the at least one touch signal to which the second touch action mode has been set.

2. The touch panel control device of claim 1, wherein the controller performs the first touch action mode by the first touch signal to which the first touch action mode has been set and performs the second touch action mode by the second touch signal to which the second touch action mode has been set.

3. The touch panel control device of claim 1, wherein the controller further comprises a memory and wherein the memory stores area information on a valid touch region of the object so as to at least distinguish the first touch action mode and the second touch action mode.

4. The touch panel control device of claim 3, wherein the memory stores information on a shape of a plurality of the valid touch regions and wherein the controller determines whether the valid touch occurs or not by using the shape information.

5. The touch panel control device of claim 3, wherein the memory stores information on a coordinate value of the line which is displayed on the displayer by the controller and information on the coordinate value of the line of which at least a portion is removed or of which the color coordinate is changed.

6. The touch panel control device of claim 1, wherein, when at least a portion of the line is removed, the width of the line which is displayed on the displayer becomes smaller or the length of the line becomes shorter.

7. The touch panel control device of claim 1, wherein the controller determines a thickness of the line to be displayed on the displayer in accordance with the first touch action mode, in response to a touch area between the object and the touch panel.

8. A touch panel control device comprising:
 a touch panel which generates at least one touch signal in response to a touch of an object;
 a displayer; and
 a controller which performs a first touch action mode in which a change of the touch position of the object is displayed on the displayer by a line in response to the object which has touched the touch panel, and performs a second touch action mode which, in response to a position change of the object which corresponds to a position of the line displayed on the displayer, includes at least one of removing at least a portion of the line displayed on the displayer and changing the color coordinate of the line; and
 wherein the controller determines a ratio of removing a width of the line displayed on the displayer in accordance with the second touch action mode or a ratio of differently setting a color coordinate of the line, in response to a touch area between the object and the touch panel.

9. The touch panel control device of claim 1, further comprising a pressure sensor which recognizes a pressure applied to the touch panel by the object and outputs a pressure signal, wherein, in response to the pressure signal, the controller determines a thickness or color coordinate of the line which is displayed in the first touch action mode, and determines a thickness or color coordinate of the line which is erased in the second touch action mode.

10. The touch panel control device of claim 9, wherein the controller further comprises a pressure signal sensor which processes the pressure signal.

11. The touch panel control device of claim 9, wherein the controller further displays pressure information corresponding to the pressure signal on the displayer.

12. A touch panel control device comprising:
a touch panel which generates at least one touch signal in response to a touch of an object;
a displayer; and
a controller which performs a first touch action mode in which a change of the touch position of the object is displayed on the displayer by a line in response to the object which has touched the touch panel, and performs a second touch action mode which, in response to a position change of the object which corresponds to a position of the line displayed on the displayer, includes at least one of removing at least a portion of the line displayed on the displayer and changing the color coordinate of the line;
wherein the controller independently sets the first touch action mode or the second touch action mode to the first touch signal in response to a capacitance change amount of a valid touch region corresponding to a touch area of the object which touches the touch panel in response to the first touch signal; and
wherein the controller compares a predetermined threshold value with at least one of a sum of a capacitance change amount of each of sensing cells within the valid touch region, the number of the sensing cells with the capacitance change amount greater than a predetermined capacitance change amount within the touch region, and the number of the sensing cells of which the capacitance change amount is greater than a predetermined rate of the maximum capacitance change amount or minimum capacitance change amount within the touch region, a ratio of a sum of a predetermined number of the upper capacitance change amounts to a sum of the predetermined number of the lower capacitance change amounts within the touch area, and then determines which one of the first and the second touch action modes the at least one touch signal of the object corresponds to.

13. A method for controlling a touch panel which displays a plurality of touch signals generated by touching the touch panel, the method comprising:
independently setting, by a touch processor, a first touch action mode or a second touch action mode in response to a capacitance change amount of a valid touch region corresponding to at least one of the touch area of the object which touches the touch panel in response to the touch signals and a distribution of a pressure which the object applies to touch panel in response to the touch signals;
performing, by an application processor, the first touch action mode by using the first touch signals to which the first touch action mode has been set for displaying at least one line by using the first touch signals the first touch action mode displaying a touch position change of an object which touches the touch panel by the at least one line; and
performing, by an application processor, the second touch action mode by using the second touch signals to which the second touch action mode has been set for removing the at least one line which has been displayed in accordance with the first touch action mode or for changing a color coordinate of the at least one line, the second touch action including at least one of removing at least a portion of the at least one line displayed in accordance with the first touch action mode and changing the color coordinate of the at least one line.

14. The method of claim 13, wherein, when a crossing of the plurality of lines displayed by the first touch action mode is touched by an object for a certain period of time during the performing the second touch action mode, the plurality of lines displayed in accordance with the first touch action mode are removed in reverse order to the displaying order of the lines.

15. The method of claim 13, wherein a start point and an end point of at least the removed portion of the line are displayed after the performing of the second touch action mode, and wherein the method further comprises displaying again the line removed in the second touch action mode by touching an interval connecting the start point with the end point.

16. The method of claim 13, wherein, in displaying the line, when the lines displayed in accordance with the first touch action mode cross each other, a thickness or color coordinate of the line at a point where the lines cross each other is displayed thicker than a thickness or color coordinate of line at a point where the lines do not cross each other.

17. The method of claim 13, wherein the thickness and color coordinate of the line to be displayed are determined by using a pressure signal in the first touch action mode and the second touch action mode.

18. A touch panel control method which performs a first touch action mode in which the change of a touch position of an object is displayed by a line in response to the object which has touched a touch panel, or performs a second touch action mode in which at least a portion of the line displayed by the first touch action mode is removed, the method comprising:
performing independently the first touch action mode and the second touch action mode respectively in response to mutually different objects, and determining whether or not a touch signal generated by the object corresponds to an input condition of the first touch action mode in which a touch position change of the object is displayed by the line;
setting any one of a first touch action mode flag and a second touch action mode flag to the touch signal in accordance with whether or not the touch signal corresponds to the input condition of the first touch action mode;
giving the same index to continuous touch signals among the touch signals given the flag, and detecting and distinguishing multiple simultaneous touches to the touch panel in accordance with the index; and
setting to perform the first touch action mode by processing the touch signal in accordance with the flag and index or setting to remove at least a portion of the line displayed in the first touch action mode or to change a color coordinate of the line by performing the second touch action mode.

19. The method of claim 18, wherein whether or not the touch signal corresponds to the input condition of the first touch action mode is determined by comparing at least one of a sum of a capacitance change amount of each of sensing cells within the touch region, the number of the sensing cells with the capacitance change amount greater than a predetermined capacitance change amount within the touch region, and the number of the sensing cells of which the capacitance change amount is greater than a predetermined rate of the maximum capacitance change amount or minimum capacitance change amount within the touch region, a ratio of a sum of a predetermined number of the upper capacitance change amounts to a sum of the predetermined number of the lower capacitance change amounts within the touch region.

20. The method of claim 18, wherein, when a crossing of the plurality of lines displayed by the first touch action mode is touched by the object for a certain period of time during the performing the second touch action mode, the plurality of lines displayed in accordance with the first touch action mode are removed in reverse order to the displaying order of the lines.

21. The method of claim 18, wherein a start point and an end point of at least the removed portion of the line are displayed after the performing of the second touch action mode, and wherein the method further comprises displaying again the line removed in the second touch action mode by touching an interval connecting the start point with the end point.

22. The panel control method of claim 18, wherein, in displaying the line, when the lines displayed in accordance with the first touch action mode cross each other, a thickness or color coordinate of the line at a point where the lines cross each other is displayed thicker than a thickness or color coordinate of line at a point where the lines do not cross each other.

23. The method of claim 18, wherein the thickness and color coordinate of the line to be displayed are determined by using a pressure signal in the first touch action mode and the second touch action mode.

* * * * *